United States Patent [19]

Gordon

[11] 4,277,231
[45] Jul. 7, 1981

[54] METHOD AND APPARATUS FOR PRESSURE FORMING PIPE BELLS

[76] Inventor: John H. Gordon, 855 Brandywine Rd., Downingtown, Pa. 19335

[21] Appl. No.: 77,657

[22] Filed: Sep. 21, 1979

[51] Int. Cl.³ .......................................... B29D 23/00
[52] U.S. Cl. ............................ 425/387.1; 425/393; 425/DIG. 218
[58] Field of Search ............... 425/387.1, 392, 393, 425/DIG. 218; 264/296, 322

[56] References Cited

U.S. PATENT DOCUMENTS

| | | | |
|---|---|---|---|
| 1,698,999 | 1/1929 | Hothersall . | |
| 3,205,535 | 9/1965 | Niessner et al. | 18/14 |
| 3,484,900 | 12/1969 | Sands et al. | 18/19 |
| 3,728,059 | 4/1973 | de Putter | 425/155 |
| 3,732,054 | 5/1973 | Lyng | 425/393 |
| 3,849,052 | 11/1974 | Gordon | 425/387.1 |
| 3,852,016 | 12/1974 | Delauzun | 425/393 |
| 3,960,472 | 6/1976 | O'Conner et al. | 425/393 |
| 3,989,439 | 11/1976 | Schmitzberger | 425/392 |
| 4,032,282 | 6/1977 | Wilson et al. | 425/393 |
| 4,063,862 | 12/1977 | Johansson | 425/392 |
| 4,080,140 | 3/1978 | Wilson et al. | 425/393 |
| 4,161,384 | 7/1979 | McGregor | 425/393 X |

*Primary Examiner*—Thomas P. Pavelko
*Attorney, Agent, or Firm*—Weiser, Stapler & Spivak

[57] ABSTRACT

A method and apparatus for pressure forming plastic pipe bells utilizing external air pressure is disclosed. The apparatus includes a horizontally oriented, shaped mandrel, which may or may not have expanding segments for forming an internal groove in the pipe bell, mounted within a pressure chamber. A natural rubber circular gasket is positioned at the front end of the pressure chamber and the end of the pipe is pushed through the rubber gasket and over the mandrel. A pair of cooperating upper and lower front plates are oppositely vertically reciprocal relative to the bell end of the pipe and act to retain the gasket when pressure is built up within the pressure chamber. Suitable air and water spray inlet and outlet connections are provided.

16 Claims, 10 Drawing Figures

METHOD AND APPARATUS FOR PRESSURE FORMING PIPE BELLS

BACKGROUND OF THE DISCLOSURE

The present invention relates generally to the field of forming a bell or shaped socket in the end of a length of plastic pipe, and more particularly, is directed to a novel method and apparatus capable of producing a sharply defined bell on a previously softened end of a length of plastic pipe regardless of wall thickness.

It is the present practice to utilize known types of plastic pipe forming apparatus to provide a bell or shaped socket in one end of each length of plastic or other pipe to allow joints in adjacent lengths of pipe to be readily made in the field by utilizing known techniques and existing tools. The presently available pipe belling machines for use with plastic pipes usually incorporate a means to heat one end of the plastic pipe prior to belling to sufficiently soften the plastic to permit shaping the bell. The existing belling apparatus utilize a mandrel means to shape the interior of the bell at the heated pipe end and external clamps to shape the exterior periphery of the belled end during the belling process. It is also common practice to reciprocate the mandrel means into and out of the end of the pipe during the belling process. The prior art devices usually also incorporate suitable cooling means to set the shaped end after the withdrawal of the mandrel means in a rapid manner to provide efficient utilization of the machine and to reduce time requirements and production costs.

It is now increasingly popular and usually necessary to provide an interior groove in the shaped bell as the pipe bell is formed to accommodate a sealing gasket. The sealing gasket is secured within the groove and is employed on the job site to quickly and automatically seal the pipe joint when adjacent lengths of pipe are joined together. To form such an internal groove in the pipe bell, it is now the common practice to provide a plurality of expanding and contracting cooperating segments within a mandrel construction to thereby permit the mandrel to automatically and simultaneously form the interior configuration of the pipe bell and also to form the interior peripheral groove.

It will be appreciated that wall thicknesses of plastic pipes vary widely from pipe to pipe due to the design requirements of such parameters as pipe diameter, type of intended service of the pipe, the type of plastic employed in fabricating the pipe, pressure requirements of the finished pipeline and other such design considerations. Due to the variances in wall thickness of the different plastic pipes which are now presented to a belling fabricator for pipe belling purposes, each mandrel apparatus for each diameter of pipe has to be equipped with various sized external clamps, which clamps are specifically designed and configured for a particular pipe wall thickness. Accordingly, it is possible for one mandrel to require several sets of clamps in order to make a pipe belling machine relatively universally adaptable for the pipes normally treated by a single plant. In other instances, additional tooling costs were involved in carefully machining the clamps to assure forming bells with minimum acceptable wall thickness throughout the entire bell, including the critical area in and about the internal groove. Because of this, tooling and equipment costs have become quite expensive when utilizing existing machines to form pipe bells by employing the combination of a mandrel with external clamps.

Additionally, the external clamps have proved to be deficient to a degree in that the use of such external clamps has usually resulted in marring the exterior periphery of the belled end of the pipe due to imperfections in the surfaces of the clamps, and imperfections in the mating surfaces of the cooperating upper and lower clamp halves possibly caused by misalignment of the parts during the bell forming operations.

SUMMARY OF THE INVENTION

The present invention relates generally to pipe belling apparatus, and more particularly, is directed to a novel pipe belling machine which employs a stationary internal mandrel in combination with an external pressure chamber to form a uniform, sharp bell on plastic pipes of all wall thicknesses.

The present invention includes a pressure chamber and a stationary, horizontally oriented mandrel within the pressure chamber. The mandrel may be equipped with a plurality of cooperating segments which are designed in known manner to expand to form an internal, peripheral groove as the bell is formed in one end of a length of plastic pipe. The segments are then collapsed to permit the shaped bell to be withdrawn from the mandrel.

A pair of separable, upper and lower front plates are vertically separable in front of the mandrel and pressure chamber to receive a heated and softened end of a length of plastic pipe therebetween and to form a gasket retainer at the front of the pressure chamber. An annular resilient gasket, which preferably is formed of rubber is affixed at the front end of the pressure chamber in concentric alignment with the mandrel. The opening defined by the gasket is less than the outside diameter of the pipe and the gasket acts to tightly seal the front end of the pressure chamber about the pipe after the end of the pipe is pushed onto the mandrel and the upper and lower front plates are reciprocated to their sealing positions.

The pressure chamber is provided with a fluid inlet fitting whereby an external fluid pressure of between 80 psi to 100 psi can be applied interiorly of the pressure chamber and exteriorly about the pipe. The fluid pressure uniformly presses the plastic material of the heated end of the pipe against the mandrel for precise and definitive bell forming. The application of the exterior fluid pressure forces uniformly presses the soft, heated plastic pipe sidewall against the mandrel to accentuate the forming of the bell and to provide sharp definition at all curved or straight finished bell interior configurations. In this manner, a lock-in type pipe gasket can be secured within a square or other configuration groove to prevent gasket displacement or dislodging when the pipe joint is being made up in the field.

It is noteworthy that the interior area defined within the pressure chamber is larger in dimension than the exterior periphery of the finished pipe bell and that the walls defining the pressure chamber do not contact or engage the exterior of the pipe bell in any maner. It is the fluid pressure itself that presses the heated, soft pipe sidewall material against the mandrel for bell forming without the need for exterior clamps or similar tooling. Accordingly, a single pressure chamber can be employed with a single mandrel for bell forming whereby the same apparatus can be employed for use with the same diameter pipes of varying wall thicknesses without special or additional tooling.

It is therefore an object of the present invention to provide an improved pipe belling apparatus of the type set forth.

It is another object of the present invention to provide a novel pipe belling apparatus to form a sharply defined bell in a heated end of a length of plastic pipe without employing exterior clamps.

It is another object of the present invention to provide a novel pipe belling apparatus that comprises a non-reciprocal mandrel to form the interior configuration of a pipe bell, a pressure chamber including a front gasket and a pair of cooperating, oppositely reciprocal, front plates to form a back up for the gasket to seal the front end of the pressure chamber about the bell end of the pipe when fluid pressure is applied to uniformly press the pipe sidewalls against the mandrel.

It is another object of the present invention to provide a novel pipe belling apparatus comprising stationary mandrel means to form the configuration of the pipe bell and pressure chamber means encompassing the mandrel means to apply exterior fluid pressure forces uniformly about the exterior periphery of the pipe bell.

It is another object of the present invention to provide a novel method for pressure forming plastic pipe bells comprising the steps of softening one end of a length of plastic pipe, pushing the softened end onto a shaped mandrel, pressurizing the exterior periphery of the pipe and forcing the softened end against the mandrel to form a shaped bell, cooling the shaped bell and relieving the pressure and then pushing the belled pipe away from the mandrel.

It is another object of the present invention to provide a novel apparatus for pressure forming a pipe bell in one end of a length of pipe which comprises a pressure chamber having interior dimensions greater than the exterior dimensions of the bell, a shaped mandrel secured within the pressure chamber, the pressure chamber having a rubber annular gasket concentrically positioned in front of the mandrel to define the front of the pressure chamber, a pair of oppositely reciprocal front plates to retain the gasket upon application of pressure, fluid pressure inlet and outlet connections in the chamber walls to permit the build up of interior fluid pressures within the pressure chamber to uniformly press the pipe end radially toward the mandrel and means to push the shaped or belled pipe end away from the mandrel.

It is another object of the present invention to provide a novel apparatus for pressure forming pipe bells that is simple in design, rugged in construction and troublefree when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
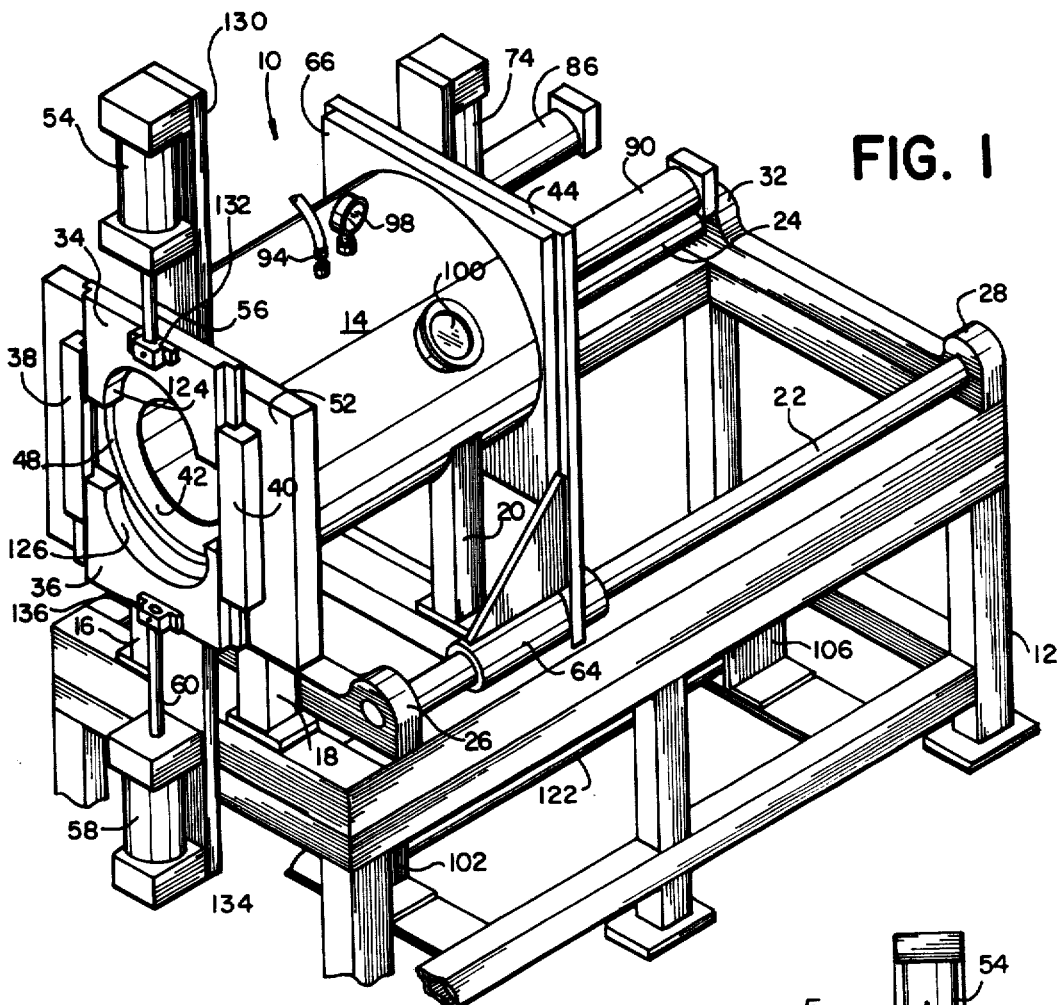
FIG. 1 is a perspective view of pipe belling apparatus in accordance with the present invention.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 a pipe belling machine 10 constructed in accordance with the teachings of the present invention. The machine includes generally a frame 12 upon which is mounted a pressure chamber 14. A pair of laterally spaced, left and right rails 22, 24 are respectively secured above the frame 12 to permit longitudinal reciprocation of the mandrel plate 44 relative to the machine frame 12, as hereinafter more fully set forth.

The pressure chamber 14 is carried upon a plurality of forward and rearward supports 16, 18, 20 which supports affix the pressure chamber in fixed relationship to the frame 12. The left and right rails 22, 24 are carried upon the frame in fixed relationship between respective forward and rearward supports 26, 28, 30 and 32 to permit longitudinal reciprocation of the mandrel plate 44 relative to the pressure chamber 14. The mandrel plate 44 is carried downwardly in respective left and right bearing blocks 62, 64, which bearing blocks are arranged in sliding engagement with the rails 22, 24 to facilitate longitudinal movement of the mandrel plate along the rails for mandrel servicing, as hereinafter more fully set forth.

The pressure chamber 14 terminates rearwardly in a pressure tight rear chamber wall 66 which is provided with a central opening 114 through which the mandrel 70 is positioned in replaceable arrangement. The rear chamber wall 66 is sealed against the leakage of pressure about the mandrel bearing plate 44 by a rearwardly positioned, concentric O-ring gasket 68. Accordingly, when the mandrel 70 is positioned in operative arrangement, the mandrel bearing plate 44 is urged forwardly into tight, face to face contact with the rear chamber wall 66 in pressure tight arrangement as provided by the seal 68.

The pressure chamber 14 may be provided with an inspection port 100, a pressure gage 98 and inlet and outlet connections 94, 96 for functional operation as hereinafter set forth in well known manner.

The pressure chamber 14 terminates forwardly in the front plate 52 which is provided with a concentric central opening 128 to receive the end of the pipe 116 to be belled therethrough as hereinafter more fully set forth. A pair of left and right front door guides 38, 40 forwardly mount upon the front plate 52 to provide a vertical track within which the upper and lower front plates 34, 36 are vertically reciprocal. An upper cylinder 54 secures to the support 130 in vertical, spaced juxtaposition to the top of the front plate 52 and reciprocates its piston rod 56 to vertically reciprocate the upper front plate 34 within the left and right guides. The upper cylinder 54 is securely mounted upon the support 130 and is maintained in stationary relationship to the pressure chamber 14. The piston rod 56 has its end secured to the upper front plate 34 utilizing a suitable fitting 132 to vertically reciprocate the front plate 34 in response to actuation of the upper cylinder 54. Similarly, the lower cylinder 58 is secured in position upon the lower support 134 in fixed relationship below the pressure chamber 14. The cylinder 58 reciprocates its piston rod 60 to vertically reciprocate the lower front plate 36. The end of the lower piston rod 60 is secured near the bottom of the lower front plate 36 by utilizing a suitable fitting or coupling 136. In operation, as hereinafter more fully set forth, the upper and lower cylinders 54, 58 are functioned by the control circuit (not illustrated) to simultaneously and oppositely reciprocated the respective upper front plate 34 and lower front plate 36 to facilitate the pipe belling operation.

Figure 3:
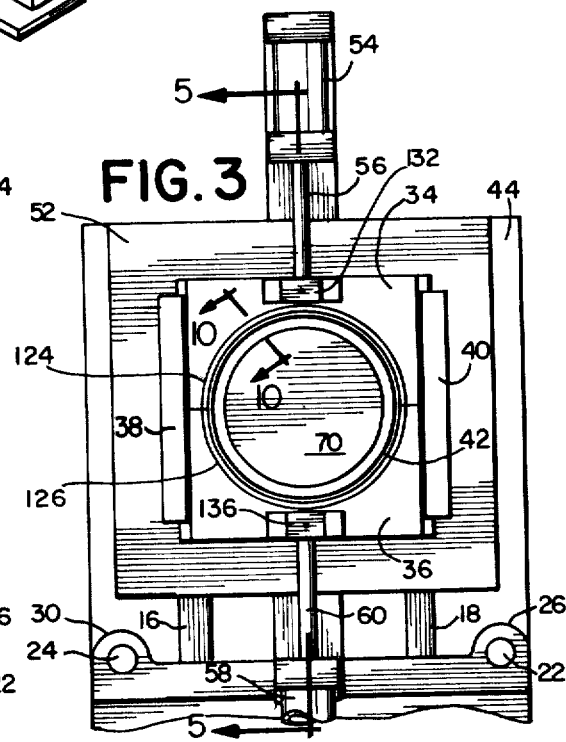
FIG. 3 is a front elevational view similar to FIG. 2 and showing the front pressure plates in their closed or pipe belling positions.

The upper front plate 34 is provided with a semi-circular opening which faces downwardly toward the lower plate 36 of size and configuration to clamp against the outer periphery of the pipe 116 during the belling operation. Similarly, the lower front plate 36 is provided with a corresponding, opposite, semi-circular opening which is upwardly open in the direction of the upper front plate 34 for pipe clamping purposes during the pipe belling operation. The upper front plate semi-circular opening is lined in known manner with a resilient gasket 124 for sealing against the outer periphery of the pipe 116 during pipe belling. See FIG. 5. Similarly, the semi-circular opening in the lower plate 36 is lined with a resilient gasket 126 which presses against the outer periphery of the pipe 116 during the pipe belling process to prevent the escape of pressurized air from within the chamber 114 during the belling cycle. As best seen in FIG. 3, when the upper and lower front plates 34, 36 are urged to their closed position for pipe belling, the upper gasket 124 and the lower gasket 126 endwardly abut to form a complete circular seal about the outer periphery of the pipe.

Figure 5:
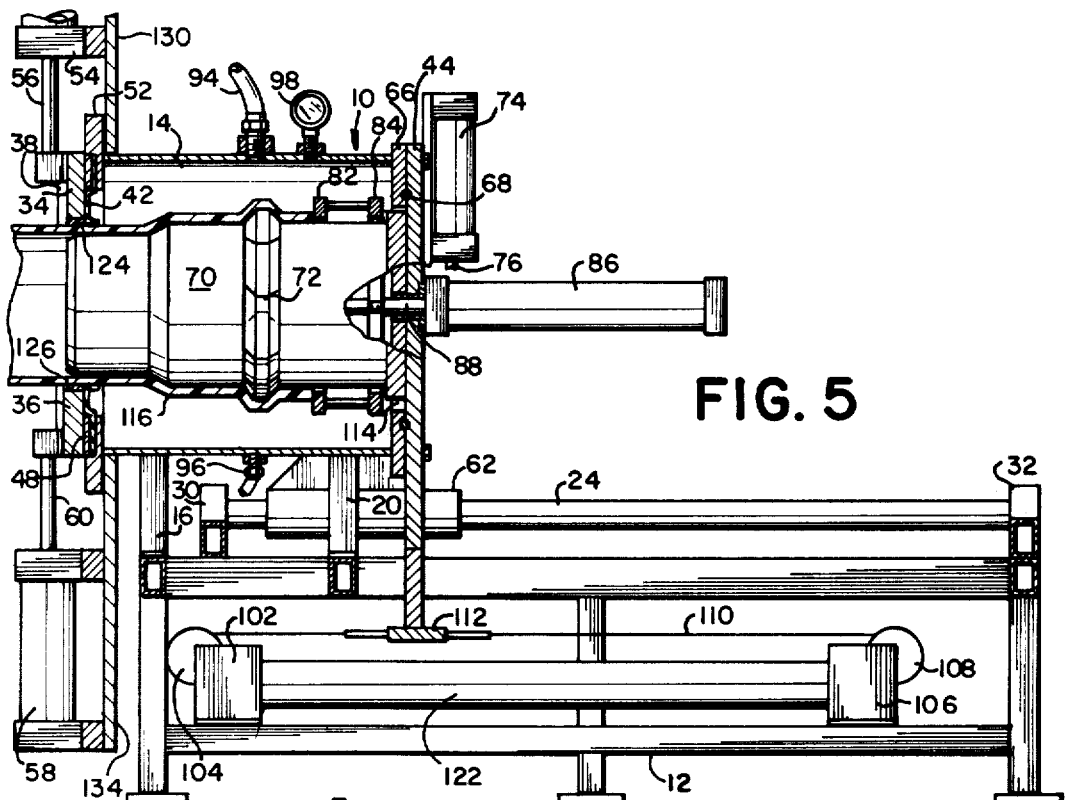
FIG. 5 is a cross-sectional view taken along line 5—5 on FIG. 3, looking in the direction of the arrows.
Figure 4:
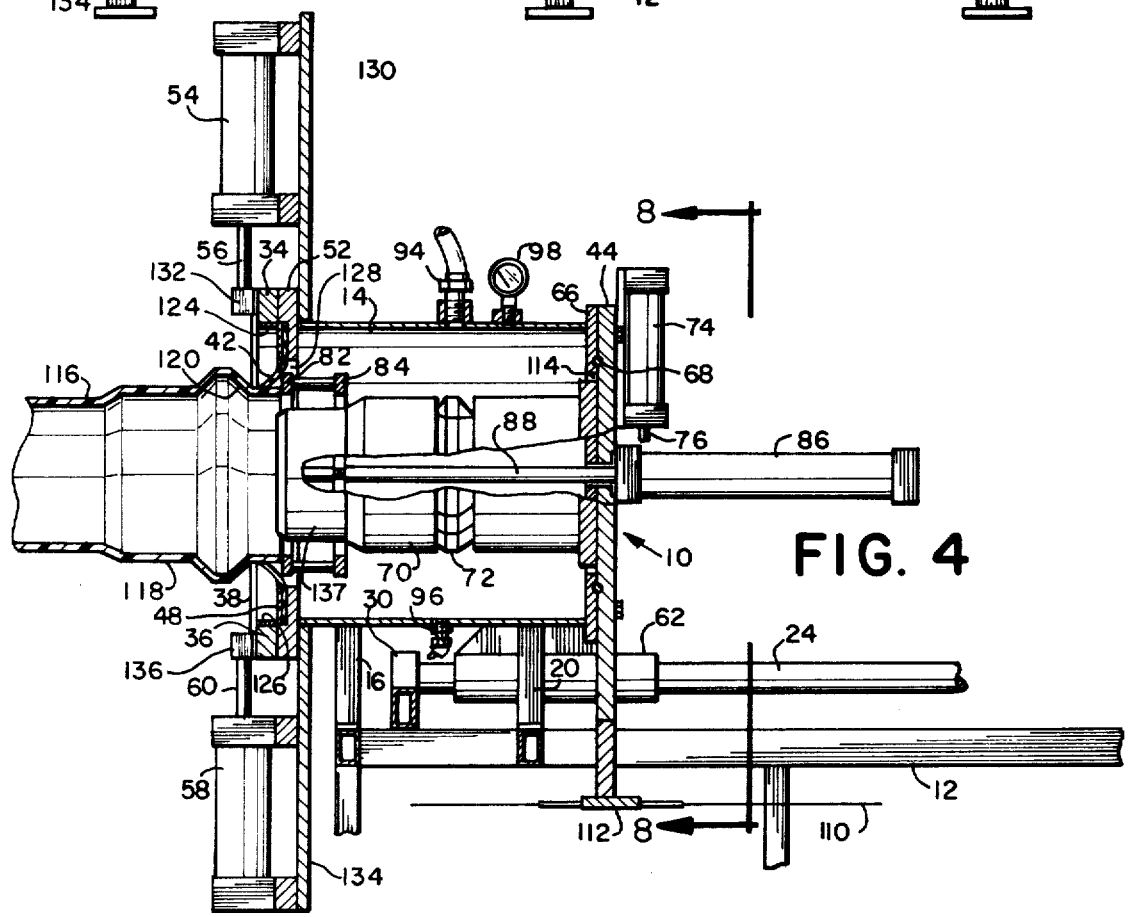
FIG. 4 is a cross-sectional view taken along line 4—4 on FIG. 2, looking in the direction of the arrows.
Figure 8:
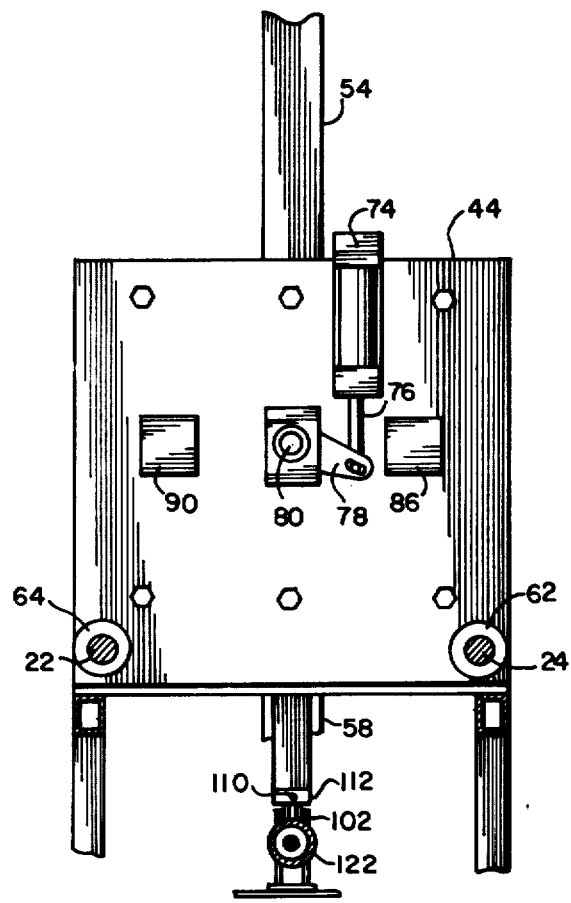
FIG. 8 is an enlarged, rear elevational view looking from line 8—8 on FIG. 4 in the direction of the arrows.

Referring now to FIGS. 4 and 5, a shaped mandrel 70 of known design is mounted in stationary relationship upon the mandrel plate 44 and is normally positioned within the interior of the pressure chamber 14 in stationary relationship thereto for pipe belling as hereinafter more fully set forth. The mandrel 70 is conventionally formed to provide a shaped profile 137 in known manner and in the preferred embodiment, incorporates a plurality of expanding segments 72 of suitable shape and function to form an internal groove 120 in the pipe bell 118 (FIG. 4). Referring also to FIG. 8, it will be observed that a mandrel segment cylinder 74 is mounted in stationary relationship upon the mandrel plate 44 to reciprocate its piston rod 76. A crank 78 is reciprocal upon reciprocation of the piston rod 76 to reciprocally rotate the mandrel segment shaft 80. The mandrel segment shaft 80 functions the plurality of expanding segments 72 from their inward, pipe accepting position as illustrated in FIG. 4 to their expanded, groove forming position as illustrated in FIG. 5. Upon completion of the pipe belling and groove forming operation, the cylinder 74 is energized to withdraw its piston rod 76 to thereby urge the segments 72 to their inward position as illustrated in FIG. 4, whereby the belled pipe 116 can be stripped or removed from the mandrel 70.

Still referring to FIGS. 4 and 5, it will be observed that a stripper ring 82 is secured to a backup ring 84 and is reciprocal from a pipe accepting position as illustrated in FIG. 5 to a pipe stripping position as illustrated in FIG. 4. A pair of right and left cylinders 86, 90 respectively rearwardly mount upon the mandrel plate 44 and respectively reciprocate their associated piston rods 88, 92 through sealed openings provided in the mandrel plate 44. The left and right piston rods 92, 88 forwardly terminate at the backup ring 84 and operate in unison to either push the backup ring 84 and the attached stripper ring 82 to the forward or pipe stripping position as illustrated in FIG. 4 or to pull the backup ring and the affixed stripper ring to the rearward, pipe accepting position as illustrated in FIG. 5. The right and left cylinders 86, 90 function in unison to provide even, laterally opposed, balanced forces for stripper ring 82 reciprocation within the interior of the pressure chamber 14 during the pipe belling procedures.

Figure 2:
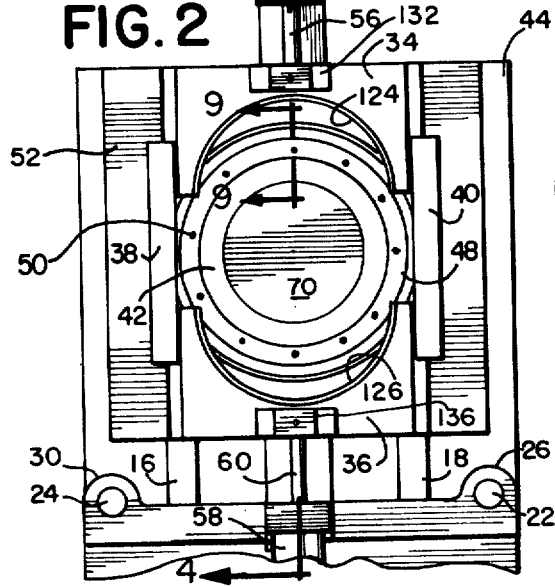
FIG. 2 is a front elevational view of the apparatus of FIG. 1 showing the front pressure plates in their initial or open positions.
Figure 9:
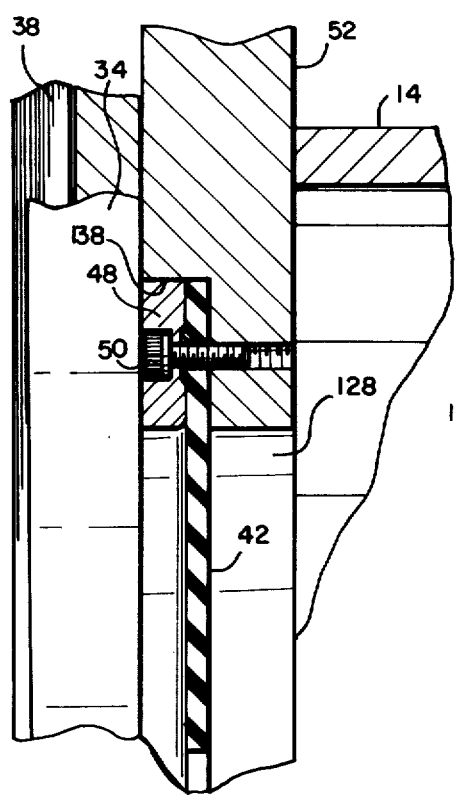
FIG. 9 is an enlarged, partial, cross-sectional view taken along line 9—9 on FIG. 2, looking in the direction of the arrows.
Figure 10:
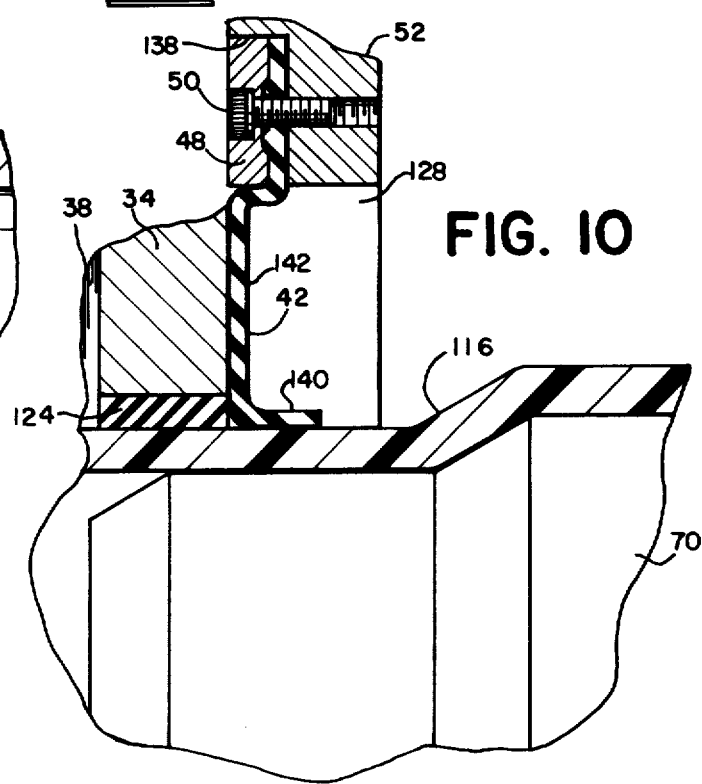
FIG. 10 is an enlarged, partial, cross-sectional view taken along line 10—10 on FIG. 3, looking in the direction of the arrows.

Referring now to FIGS. 2, 9 and 10, it will be observed that the front entrance to the pressure chamber 14 includes a pipe receiving opening 128 through the front, gasket mounting plate 52 which is generally round in conjunction and of suitable size to facilitate the entrance and exit of the pipe 116 both prior to belling and after the bell shape 118 has been impressed upon the end of the pipe. A flat, annular, heavy rubber gasket 42 is peripherally retained within a circular, recessed opening 138 which is formed in the front surface of the front plate 52. A circular backup plate of size to fit within the front, circular recess 138 overfits the periphery of the rubber gasket 42 to secure the gasket periphery to the plate 52 about the pipe opening 128. A plurality of circularly spaced bolts 50 affix the backup plate 48 to the gasket plate 52 in a secure manner to prevent removal of the gasket periphery, even after many repeated cycles of insertion of plastic pipes for belling the ends thereof within the chamber 14.

Figure 6:
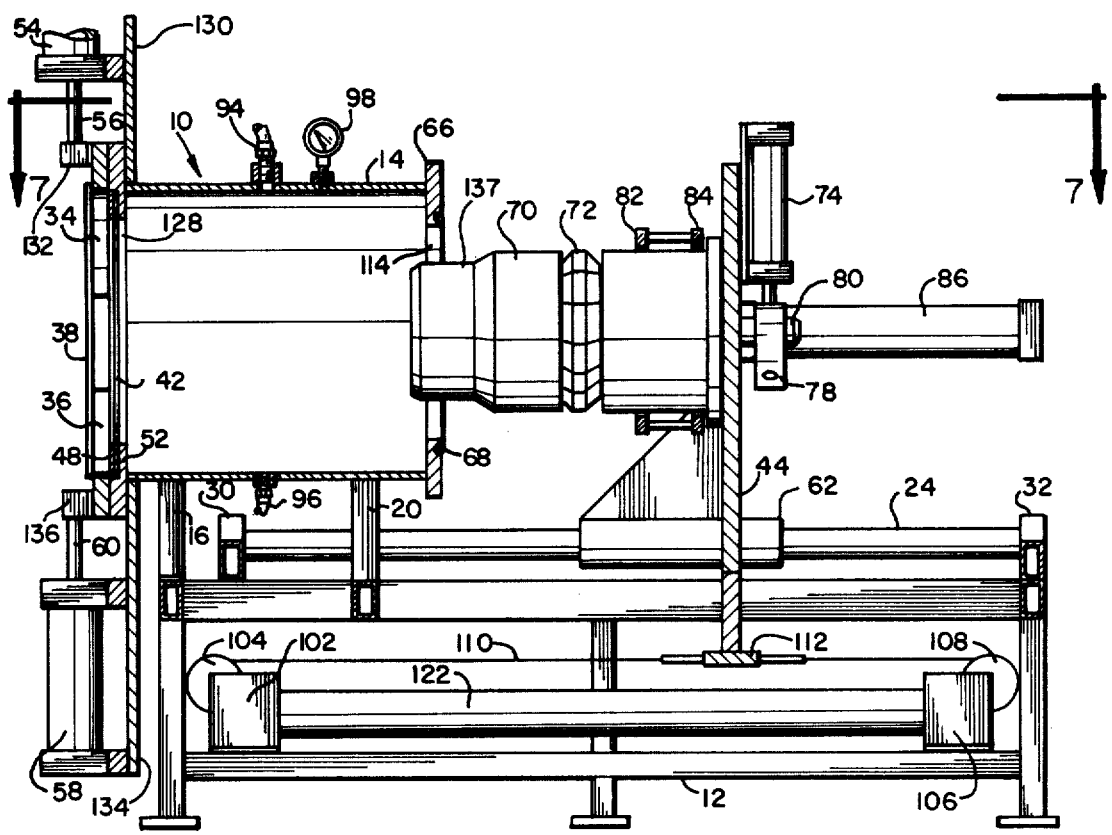
FIG. 6 is a view similar to FIG. 4 showing the mandrel withdrawn to a rearward position.
Figure 7:
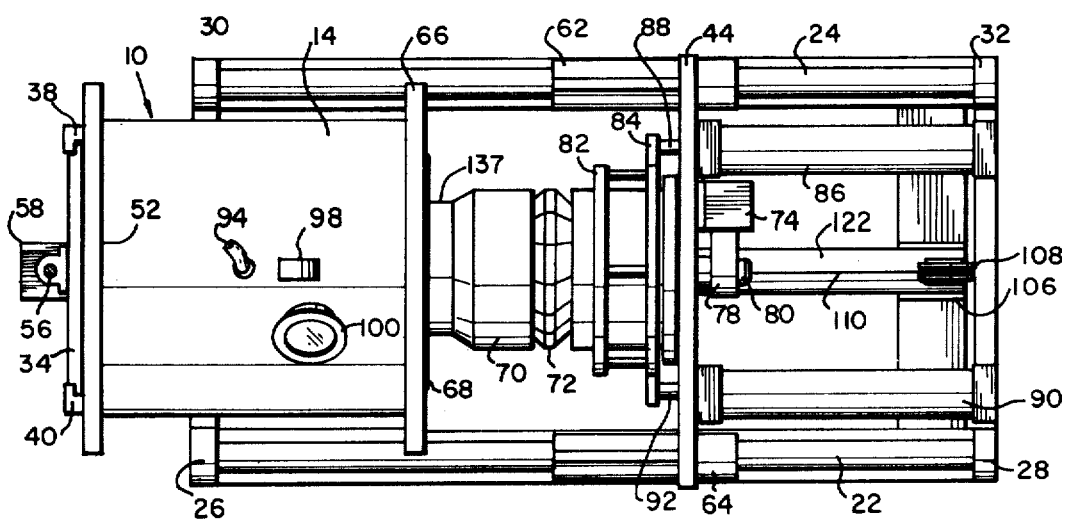
FIG. 7 is a top plan view looking from line 7—7 on FIG. 6 in the direction of the arrows.

Referring to FIGS. 6 and 7, the operation of the mandrel replacement system will now be described. As shown, a horizontally oriented, double acting cylinder 122 is secured to the frame 12 between the forward and rearward mounting blocks 102, 106 to maintain the cylinder 122 in fixed relationship upon the frame 12. A positioning wire 110 secures to the mandrel plate 44 through a suitable connector block 112 to urge the mandrel plate 44 (and the affixed mandrel 70) forwardly and rearwardly along the left and right rails 22, 24 in response to forces generated upon activation of the double acting cylinder 122. The wire 110 is trained about forward and rearward pulleys 104, 108 and has its ends (not shown) interconnected with the movable parts of the hydraulic cylinder 122 to suitably move the mandrel plate 44 in response to activation of the cylinder 122. Accordingly, when it is desired to service the mandrel 70 or perhaps to replace the mandrel with a mandrel of different size depending upon the diameter of the pipe 116 to be belled, the cylinder 122 is activated in well known manner to pull the wire 110 rearwardly and to thereby also slide the mandrel plate 44 which is affixed to the wire 110 rearwardly by sliding the left and right bearing blocks 62, 64 along their respective associated rails 24, 22. As illustrated in FIG. 6, the rearward movement of the mandrel plate 44 pulls the mandrel 70 from within the pressure chamber 14 to expose the mandrel for servicing, replacement, etc. Upon the completion of the mandrel servicing operations, the cylinder 122 can again be actuated in known manner to urge the wire 110 forwardly and to also forwardly move the affixed mandrel plate 44 to assume the position illustrated in FIGS. 4 and 5. It is noteworthy that when the mandrel plate 44 is urged forwardly as far as possible, the O-ring gasket 68 serves to rearwardly seal the pressure chamber to prevent the escape of pressure between the rear chamber wall 66 and the movable mandrel plate 44.

In order to operate the belling machine of the present invention, the upper and lower front plates 34, 36 are opened to an initial position as illustrated in FIG. 1 and FIG. 2 to thereby expose the pressure chamber front opening 128 and the front annular rubber gasket 42. As above set forth, the front plates 34, 36 are oppositely slidable along the guides 38, 40 upon function of the respective upper and lower cylinders 54, 58 in known manner.

With the front plates 34, 36 separate in their initial position, a length of plastic pipe 116 having the end to be belled preheated and softened in known manner is then urged axially inwardly through the opening 128 and over the shaped profile 137 of the mandrel 70 by utilizing a pipe pushing means (not shown) of any suitable, known design. The leading edge of the pipe 116 is urged rearwardly on to the mandrel 70 until the leading edge contacts the stripper ring 82. In a desirable embodiment, the stripper ring 82 may be forwardly urged a slight distance to create additional thickness of plastic pipe material at the end to be belled, which additional thickness can be utilized during the belling operation to prevent thin wall sections from occurring at points of stress, for example in and about the formed groove 120. It is noteworthy that the gasket 42 is formed with a central opening that is smaller in diameter than the outside diameter of the pipe 116. Accordingly, as the pipe 116 is axially urged rearwardly over the mandrel 70, the outer periphery of the pipe 116 will contact the inward circular periphery of the gasket 42 and will cause the inward edge to bend inwardly to form a generally L-shaped pressure retaining leg 140 over the periphery of the pipe. See FIGS. 5 and 10.

With the pre-heated, softened end of the pipe fully seated upon the mandrel 70, the upper and lower cylinders 54, 58 are actuated to press the upper and lower front plates 34, 36 together to completely enclose the front opening 128. The semi-circular front gaskets 124, 126 form a continuous, front seal about the periphery of the pipe to both frictionally engage the pipe and to prevent leakage of pressure thereabout. See FIG. 3. As soon as the front plates 34, 36 are urged to their sealing position as shown in FIGS. 3 and 5, suitable hydraulic pressure, for example, air pressure between 80 psi and 100 psi can be introduced into the interior of the pressure chamber through the inlet fitting 94. The entrance of pressurized forces into the interior of the pressure chamber 14 uniformly pressurizes the entire interior of the pressure chamber and thereby imposes uniformly applied forces against the heated end of the pipe 116 to force the pipe against the profile 137 of the mandrel 70 in an overall uniform manner. If a groove 120 is to be formed in the pipe bell 118, the segment cylinder 74 is activated to expand the plurality of segments 72 as illustrated in FIG. 5. The pressure is maintained in the chamber 14 for a sufficient length of time to allow the bell shape 118 to be impressed in a permanent manner in the softened end of the pipe 116 in the usual manner. Spray cooling may be employed at this point in known manner to spray cooling liquid in the pressure chamber interior about the newly formed pipe bell 118 to enhance the hardening procedures.

As best seen in FIG. 10, upon closing of the upper and lower front plates 34, 36, pressure can be built up within the interior of the pressure chamber 14 to uniformly apply pressure about the end of the pipe to be belled to uniformly press the pipe end against the mandrel profile 137. The interior built up pressure acts outwardly and downwardly against the front gasket 42 and forces the gasket to assume an L-shaped cross-sectional configuration comprising a front plate annual pressure retaining leg 142 and a circular pipe pressure retaining leg 140. The front plates 34, 36 serve as back-up members and retain the front plate leg 142 to prevent front blow out. The outer periphery of the leg 142 is pressed against and seals against the semi-circular front plate gaskets 124, 126. The pressure within the pressure chamber 14 also acts radially inwardly against the pipe leg 140 and circumferentially presses the leg 140 against the outer periphery of the pipe 116 in a manner to serve as an additional seal and to prevent the escape of pressure thereabout.

After the pipe bell 118 has sufficiently cooled to maintain the impressed shape, the segment cylinder 74 is again activated to withdraw the expanded segments 72 to allow the pipe bell 118 to be removed from association with the mandrel 70. The upper and lower cylinders 54, 58 are again activated to pull the front plates 34, 36 apart to their initial positions as shown in FIGS. 12 and 2 to allow the belled pipe 116 to be removed from the mandrel 70. Once the upper and lower front plates 34, 36, have been separated, the right and left stripper cylinders 86, 90 are activated to push the stripper ring 82 from the rearward position illustrated in FIG. 5 to the forward position as illustrated in FIG. 4. It is noteworthy that as the pipe 116 is pushed from the mandrel 70 by the operation of the stripper ring 82, the frictional engagement between the outer periphery of the newly formed bell 118 and the rubber gasket 42 will cause the pressure retaining leg 140 to be outwardly urged until the pipe 116 is completely removed from the pressure chamber 14.

Cooling liquid (not shown) may be introduced into the interior of the pressure chamber 14 in well-known manner upon completion of the bell shaping procedure to aid in expediting the hardening process by introducing such cooling liquid in well-known manner through the existing inlet and outlet fittings 94, 96 which can also be employed for pressurizing the pressure chamber as hereinbefore set forth or optionally, separate liquid spray inlet and outlet fittings (not shown) could be provided in the shell of the pressure chamber 14 in known manner to most advantageously effect the desired hardening of the pipe end following the bell shaping procedures.

Although the invention has been described with a certain degree of particularly, it is understood that the present disclosure has been made only by way of example and that numerous changes in the details of construction and the combination and arrangement of parts may be resorted to without departing from the scope of the invention.

What is claimed is:

1. In a pipe belling apparatus, the combination of
   a pressure chamber means comprising enclosing sidewalls, a front and a back to define an enclosed pressure chamber;
   a bell shaping mandrel means mounted in the back and positioned in the pressure chamber to form a bell shape upon one end of a length of pipe;
   a front opening in the pressure chamber means front of size suitable to receive the said pipe end therein;
   separable front plate means movable relative to the front from an open position to receive the pipe end to a closed position to close the front opening about the end of the pipe;
   pressure inlet means in the pressure chamber means to pressurize the pressure chamber whereby the end of the pipe is pressed against the mandrel means; and
   sealing means about the front opening to seal the front opening against the loss of pressure about the pipe end during the pipe belling operation.

2. The pipe belling apparatus of claim 1 wherein the mandrel means is stationarily mounted in the said back whereby the mandrel means does not move axially relative to the pressure chamber means during the pipe belling operation.

3. The pipe belling apparatus of claim 1 or 2 wherein the mandrel means comprise a plurality of radially expanding segments to form an internal groove in the belled pipe end and means to expand and contract the segments to move the segments between respective inward, pipe end accepting positions and expanded, pipe grooving positions.

4. The pipe belling apparatus of claim 3 wherein the means to expand and contract comprises a hydraulic cylinder mounted exteriorly of the pressure chamber means and a shaft movable upon function of the hydraulic cylinder, a portion of the shaft extending interiorly of the pressure chamber.

5. The pipe belling apparatus of claim 1 wherein the sealing means comprises an annular, resilient gasket secured about the front opening, the gasket being provided with a circular opening of diameter less than the outer diameter of the pipe end.

6. The pipe belling apparatus of claim 5 wherein the gasket is fabricated of rubber.

7. The pipe belling apparatus of claim 5 wherein the gasket is bent about the pipe when the front plate means is urged to the said closed position to define a pressure retaining leg and a pipe contacting leg.

8. The pipe belling apparatus of claim 7 wherein the pressure retaining leg contacts portions of the front plate means when the front plate means is moved to the said closed position.

9. The pipe belling apparatus of claim 8 wherein the pressure retaining leg circularly contacts and presses against the front plate means to seal the front opening about the pipe end when the pressure chamber is pressurized.

10. The pipe belling apparatus of claim 1 wherein the front plate means comprise a first front plate and a second front plate, the first and second front plates being movable in opposite directions toward and away from the pipe end to alternately expose the front opening to receive the pipe end and to close the front end to prevent escape of pressure about the pipe end during the belling operation.

11. The pipe belling apparatus of claim 10 wherein each front plate comprises a semi-circular opening, the semi-circular opening being of configuration to clamp against the outer periphery of the pipe end.

12. The pipe belling apparatus of claim 11 wherein each semi-circular opening is lined with a semi-circular shaped gasket.

13. The pipe belling apparatus of claim 12 wherein the semi-circular gasket of the first front plate and the semi-circular gasket of the second front plate endwardly contact each other when the front plates are urged to their said closed positions to form a circular seal about the pipe end.

14. The pipe belling apparatus of claim 1 and means to move the pressure chamber back relative to the sidewalls to permit access to the mandrel means.

15. The pipe belling apparatus of claim 14 wherein the means to move comprises a track and bearing block affixed to the back, the bearing block being in sliding engagement upon the track.

16. The pipe belling apparatus of claim 14 or 15 wherein the means to move comprises a cylinder and a connector interposed between the cylinder and the back, the connector imposing upon the back forces generated by the cylinder to move the back upon activation of the cylinder.

* * * * *